United States Patent
Galand et al.

(12) 
(10) Patent No.: US 6,424,624 B1
(45) Date of Patent: *Jul. 23, 2002

(54) METHOD AND SYSTEM FOR IMPLEMENTING CONGESTION DETECTION AND FLOW CONTROL IN HIGH SPEED DIGITAL NETWORK

(75) Inventors: Claude Galand, La Colle sur Loup; Pierre-Andre Foriel, Cagnes sur Mer; Aline Fichou, La Colle sur Loup, all of (FR); Marcus Enger, Hirschhorn (DE)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,786

(22) Filed: Oct. 7, 1998

(30) Foreign Application Priority Data

Oct. 16, 1997 (EP) .............................. 97480070

(51) Int. Cl.⁷ .............................. G06F 11/10; H04L 1/16
(52) U.S. Cl. ...................... 370/231; 370/253; 370/400; 709/235
(58) Field of Search ................................ 370/229–235, 370/400, 419, 420, 463, 252, 253, 522; 709/235, 239

(56) References Cited

U.S. PATENT DOCUMENTS

| | | | |
|---|---|---|---|
| 5,115,429 A | * | 5/1992 | Hluchyj et al. ............. 370/231 |
| 5,313,454 A | | 5/1994 | Bustini et al. |
| 5,426,640 A | * | 6/1995 | Hluchyj et al. ............. 370/235 |
| 5,436,891 A | * | 7/1995 | Grossman et al. .......... 370/231 |
| 5,497,375 A | * | 3/1996 | Hluchyj et al. ............. 370/235 |
| 5,629,927 A | | 5/1997 | Waclawsky et al. |
| 5,787,071 A | | 7/1998 | Basso et al. |
| 5,790,522 A | | 8/1998 | Fichou et al. |
| 5,815,492 A | | 9/1998 | Berthaud et al. |
| 5,898,691 A | | 4/1999 | Liu |
| 5,912,894 A | | 6/1999 | Duault et al. |
| 6,011,776 A | | 1/2000 | Berthaud et al. |
| 6,091,708 A | * | 7/2000 | Matsunuma ................. 370/233 |
| 6,108,304 A | * | 8/2000 | Abe et al. ................... 370/232 |
| 6,118,791 A | | 9/2000 | Fichou et al. |

OTHER PUBLICATIONS

The ATM Forum Technical Committee, Traffic Management Specification Version 4.0, Apr. 1996.

* cited by examiner

Primary Examiner—Wellington Chin
Assistant Examiner—Saba Tsegaye
(74) Attorney, Agent, or Firm—Cesari and McKenna, LLP

(57) ABSTRACT

This system is made to perform congestion detection and flow control in high speed digital packet switching network (22) carrying discardable and non-discardable traffic. Forward traffic received at a destination system over a first connection from a source system is monitored. If a congestion-indicating bit is detected in a received packet, a backward congestion indicator is set in packets flowing from the destination system to the source system over a second connection. The source system integrates the number of backward congestion indicators received over successive periods of time using a count-up, count-down counter. Specific congestion control actions are taken at the source system as a function of the counter state at the end of each of the successive periods of time. The congestion control actions may include increasing or decreasing the bandwidth allocated to discardable traffic intended to be delivered over the first connection.

15 Claims, 8 Drawing Sheets

METHOD AND SYSTEM FOR IMPLEMENTING CONGESTION DETECTION AND FLOW CONTROL IN HIGH SPEED DIGITAL NETWORK

FIELD OF THE INVENTION

This invention relates to congestion detection and flow control in high speed packet switching networks and more particularly to methods and apparatus for implementing congestion detection and flow control for low priority traffic with optimized cost efficiency.

BACKGROUND ART

Modern digital networks often operate in a multimedia environment and interconnect, upon demand, very large numbers of users and applications through fairly complex digital communication network topologies.

Due to the variety of users' demands and the growth of distributed applications, network traffic is consuming more bandwidth, becoming more non-deterministic and requiring more connectivity. These changes have been the driver for the emergence of fast packet switching network architectures in which data, voice and video information are digitally encoded, chopped into fixed or variable length packets (also named "cells in ATM or Asynchronous Transfer Mode networks) and transmitted through a common set of nodes and links interconnected to constitute the network communication facilities.

The need for efficient transport of mixed traffic streams on very high speed lines (sometimes referred to as links or trunks), means, imposes a set of performance and resource consumption requirements including very high throughput, very short packet processing time, the flexibility to support a wide range of connectivity options and efficient flow and congestion control. Congestion is generally defined as a condition during which network performance is degraded due to saturation of network resources such as communication links, processor cycles, memory buffers, etc.

One of the key requirements for high speed packet switching networks is reduction of end to end delay in order to satisfy real time delivery constraints and to achieve the necessary high nodal throughput for the transport of voice and video. Increases in link speeds have not been matched by proportionate increases in the processing speeds of communication nodes. The fundamental challenge for high speed networks is to minimize the processing time and to take full advantage of the high speed/low error rate technologies. Most of the transport and control functions provided by the new high bandwidth network architectures are performed on an end to end basis.

One basic advantage of packet switching techniques (as opposed to so-called circuit switching techniques) is that it allows statistical multiplexing of the different types of data over a line, which optimizes the utilization of transmission bandwidth. One drawback, however, is that packet switching introduces delays and jitters which might be detrimental for transmission of isochronous data, like video or voice. Methods have been proposed to control the network in such a way that delays and jitters are bounded for every new connection that is set up across the packet switched network.

Such methods are described, for instance, in a published European Application number 0000706297 and include establishing a path through the network high speed lines and nodes, via an entry node port of said network, making optimal use of the available transmission bandwidth of the network along the path to the indicated destination.

Because different type of traffics need to be treated differently to maintain their usefulness at a destination, choices have to be made among the different types by assigning different specific priorities. In other words, when a source terminal requests a connection to a destination terminal via the network (i.e., a call is set-up), a quality of service (QoS) is assigned to the call in terms of maximum permissible delay ($T_{13}$ max) and packet loss probability (P_loss).

The QoS and traffic characteristics (e.g., peak data rate, mean data rate and average packet length) are used to compute the amount of bandwidth (i.e. equivalent capacity or Ceq) to be reserved on every line on the route or path assigned to the traffic between the source terminal and the destination terminal, in order to guarantee a packet loss probability which is smaller than the loss probability (P_loss) that has been specified for the connection. However, in operation, the network traffic must be controlled dynamically which means that some packets may have to be dropped or discarded within the network to avoid traffic congestion.

In practice, it is common to reserve bandwidth for high priority packets (e.g. so-called Real Time or RT traffic) allowing such packets are transmitted in preference to lower priority packets derived from discardable traffic (e.g. Non Real Time or NRT traffic or more particularly Non Reserved or NR traffic). Lower priority packets may be sent at rates greater than their declared rate to dynamically take advantage of any bandwidth remaining after all the higher priority traffic has been served. This remaining bandwidth can vary widely depending on the actual activity of the high priority traffic sources. It is therefore of considerable importance to manage the low priority traffic so as to optimize the use of the widely varying left-over bandwidth in the network while avoiding any congestion which would reduce network throughput. This obviously requires providing the network (and eventually also the sources) with congestion detection and flow control facilities.

Various mechanisms for controlling the flow of NR traffic have been proposed. In particular, an Available Bit Rate (ABR) flow control mechanism has been proposed for Asynchronous Transfer Mode (ATM) networks. ABR flow control is based on use of a particular flow control cell, the so-called Resource Management or RM cell. RM cells are used to collect congestion information from network node switches along connection paths and to send such information back to the traffic sources. While ABR flow control seems to be very efficient, it is complex to implement. End systems must generate RM cells periodically, provide scheduling for RM cells to be sent among data cells, and shape their traffic in response to congestion indications conveyed by received RM cells. Intermediate systems (switches along the paths) must be able to differentiate RM cells from regular data cells, extract RM cells and update these with congestion information. These complexities limit the cost effectiveness of this solution.

Moreover, the above solution requires that all so-called non-reserved (i.e. low priority) sources connected to a network be treated using the ABR mechanism. In fact, if a mix of ABR sources and non-ABR sources are connected to the network, the ABR sources will be disadvantaged as compared to the non-ABR sources which need not be capable of sending RM cells. The customer must therefore update the hardware of all the end systems before using ABR support, which is an additional drawback from an engineering standpoint.

Finally, there is no description, in the ABR standard, of a policing function which could be used to protect the network from misbehaving sources or from non ABR sources.

Other mechanisms have been proposed, with flow control which can be used on ATM or PTM (Packet Transfer Mode, including variable length packets) traffic and offer good performance. These flow control mechanisms add complexity to network equipment. Access nodes or ports need to store tables of values and must have the capability of adding a time-stamp to the data packets or to specific control packets. The overhead on the lines is also increased as at least a time stamp must be added to some transmitted packets.

A further improvement was disclosed in U.S. Pat. No. 5,313,454 which made the system transparent to the user (source) by providing an internal congestion avoidance method. To that end, congestion is identified throughout the network and transferred by setting an indicator in the packet header. Then congestion indications are used in the destination node to generate a rate control message which is fed back to the entry node. This prior art still adds overhead to the feedback flow if smooth and flexible congestion control is sought. Otherwise, the flow regulation would be quite rigid and basic.

These functions are generally configured at connection setup and remain static. A more flexible solution is necessary to be able to use the available bandwidth left by the reserved traffic while avoiding high packet loss inside the network.

SUMMARY OF THE INVENTION

The present invention is a method for performing congestion detection and flow control operations for data traffic, including both discardable and non-discardable traffic, in a high speed digital packet switching network including access and transit nodes interconnected by links or trunks. Any source end-user attached to said network via an entry access node can request its traffic to be transported toward a destination end-user also attached to said network via an exit access node. So-called in-going (or forward) and return (or backward) paths are set from the entry node to the exit node and, in the opposite direction, from the exit node to the entry node. The paths might include network transit nodes.

The method includes the step of monitoring the data flow in each transit node in the forward path from the entry node to the exit node for detecting traffic congestion in the transit node. When flow congestion being detected therein, a Congestion Indication (CI) bit is set in a first predefined header field of data packets transported on the forward path to the exit node. Data packets entering the exit node are monitored. Where a set CI bit is detected, a congestion indication is fed back to the entry node by setting a Return Congestion Indication (RCI) bit in a second predefined header field in the data packets of the traffic of the backward path; RCI bits in packets received in the entry node are integrated over a predefined period of time by adding or subtracting one unit depending on the binary value of each received RCI bit. At the end of each of the predefined time periods, the value of the integrated RCI indication is checked. The communication bandwidth assigned to discardable traffic on the forward path, is adjusted as a function of the value of the integrated RCI indications.

DETAILED DESCRIPTION OF A PREFERRED EMBODIMENT OF THE INVENTION

Figure 1:
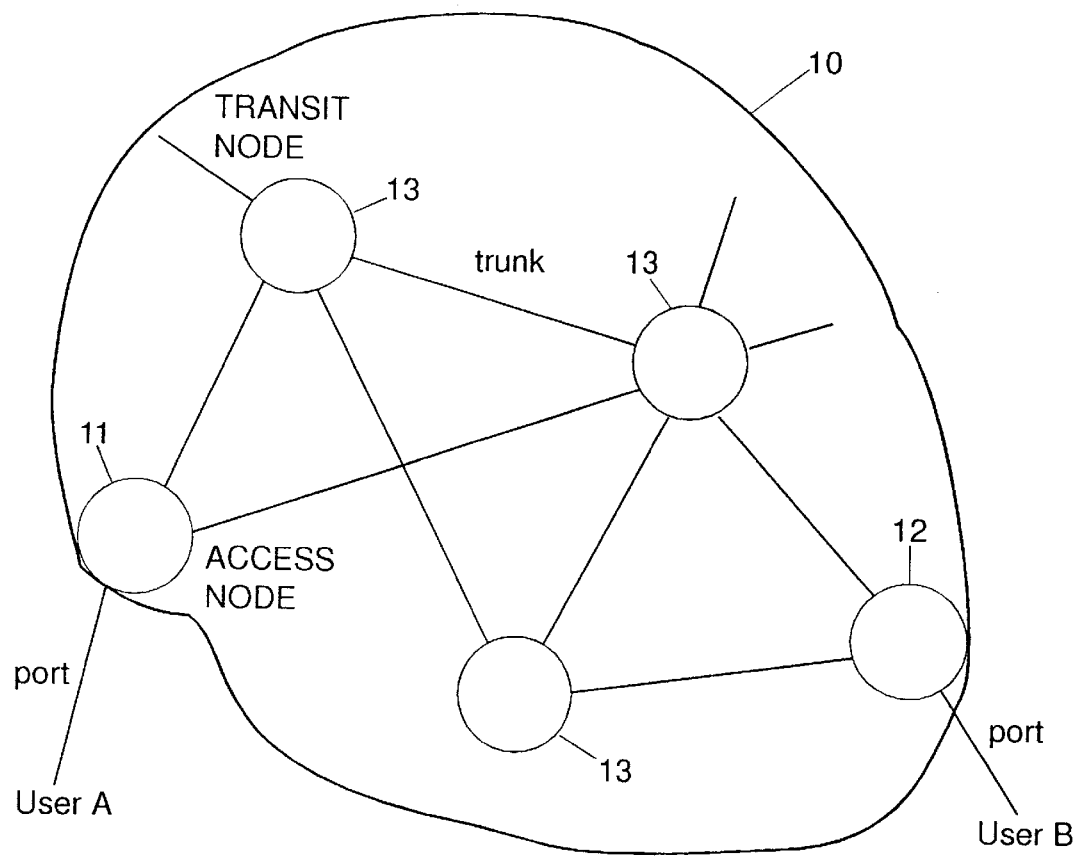
FIG. 1 is a schematic representation of a high speed digital network wherein the invention shall be incorporated.

FIG. 1 is a general block diagram of a packet transmission system 10 showing access nodes/ports 11 and 12 and intermediate or transit nodes (13), the nodes being interconnected by links or trunks. The links or trunks may provide permanent or selectively enabled (dial-up) connections between pairs of nodes. A network transit node may be attached to one or several access (entry or exit) nodes.

Each network node includes input/output adapters (including) buffers interconnected by a switch fabrics, together with data processing facilities providing data communication and network control services in the network node. Data packets (including control data) received on an input adapter may be selectively routed on one or more of the outgoing communication links or trunks through the output adapters. Routing decisions are made in response to information in header sections of the packets. The network node also provides additional services such as calculation of new paths between entry and access nodes, the provision of access control to packets entering the network, and the provision of directory services and topology database maintenance.

A network access node may operate either as a source (entry) of digital data to be transmitted to another end node, or as a data sink (exit node), or both. User A, for instance, acting as a data source utilizes an access node 11 to access the packet switching network 10. The access node translates the user's data into packets formatted for transmission on the network and also generates headers used to route said packets through the network. At call set-up, the entry node processing facilities calculates a path or route through the network from the source node (entry node) to the destination node (exit node). To avoid overload on any of the links on the path, the path is selected using an algorithm that ensures that adequate bandwidth is available for the new connection, while optimizing the overall throughput within the network.

The act of selecting a path for a particular connection implies the allocation of network resources to users in order to guarantee their Quality of Service (QoS) requirements. Various quality levels of service may be specified, some of them in order to satisfy real-time delivery constraints, others related to non real time data traffic transfer. To that end, the origin node computes a path to the destination node that is capable of carrying the new connection and providing the level of service required by the new connection. The Path Selection process uses data describing the current traffic load in the entire network (nodes and links). Such data are stored in a topology database located in each node of the network. If no suitable path can be found to meet all requirements, the connection is rejected. Once, the origin node has found a suitable path, a set-up message is generated which traverses the selected route, updating the resource allocations (including bandwidth occupancy) for each link visited by the set-up message.

To maintain high network throughput, a path is selected and resources are reserved only at the time of the connection establishment. The Path Selection process takes into account various constraints which come both from the user (quality of service requirements, user's traffic characteristics) and from the current network topology and bandwidth allocation. In addition, the algorithm maximizes the network throughput by choosing a path with the least number of hops and which tends to achieve an even distribution of the traffic among the links. Once an appropriate path has been selected, the network connection establishment process takes place, and only then are the resources along the path reserved.

Accordingly, the connections established for different sources may require different levels of bandwidth, different delay guarantees, and/or different loss probabilities. Real time signals such as voice or video, for example, require being assigned higher priority levels than non-real time signals.

As already mentioned, such connection characteristics are negotiated along with the bandwidth requirements and enforced by assigning higher priorities to the transmission of real time signals and, in case of congestion occurring, discarding non-reserved packets before discarding reserved ones. In other words network management must distinguish between guaranteed delivery traffic and so-called discardable traffic. Nevertheless, optimizing the transmission of lower priority traffic is important.

Therefore and due to the bursty nature of data traffic, traffic should be continously monitored and a mechanism provided for adjusting low priority traffic or any excess traffic in excess, and controlling the assigned bandwidth dynamically. For instance 85% of the total link bandwidth may be reserved for committed traffic, which leaves 15% of said bandwidth for dynamic assignment.

The present invention is a method and apparatus for optimizing the transmission of lower priority traffic while avoiding congestion in the network.

The design of adequate congestion schemes is extremely difficult for the following reasons:

Overhead: A congestion scheme should not increase the traffic too much, in particular when the network is congested. Even proposals of positive feedback schemes, i.e. schemes that give feedback when the network is congested, do not resolve the problem totally as they also consume resources.

Fairness: When the demands of all users cannot be satisfied, the share of satisfied demands should be fairly distributed. But neither the definition of "fairly" is trivial, nor the meaning of what is considered to be fair is invariable.

Responsiveness: The quality of the available resource is often changing dynamically. A congestion scheme has to react quickly to changes by asking users to increase or to decrease their sending rates. On the other hand, in order to maintain good throughput, only persistent congestion should be taken into account. Short term loading of the queue due to traffic bursts should be differentiated from a persistent state of congestion.

Bad environments: Under congestion, packets can be dropped, changed or delivered out of order. Despite such problems, the scheme has to continue to work.

Consideration of the totality: The final aim of a congestion scheme is to optimize the overall network performance. Schemes that optimize the throughput of one user or one trunk, do not always maximize the overall performance.

Complexity: In high speed environments there are often only a few clock cycles to process a packet in a node. Therefore, a flow control scheme has to be simple. This criteria can also be called Implementability.

Misbehaving sources: Some congestion control schemes suppose that all users are able and willing to cooperate. These schemes do often not work with misbehaving users. Greedy users can degrade the QoS for other users or can even drive the network into long term congestion.

The aim of the system of this invention is to check the traffic by detecting congestion in any node of the network and then monitor the traffic flow accordingly on a port-to-port basis, while optimizing the network by complying with the requirements to avoid the drawbacks as indicated in the prior listed criteria, e.g. by minimizing traffic overhead, and yet enabling a smooth and flexible congestion control; being insensitive to misbehaving source users, and yet enabling a control of behaving sources at almost no additional cost; being perfectly implementable and rather not complex.

Figure 2:
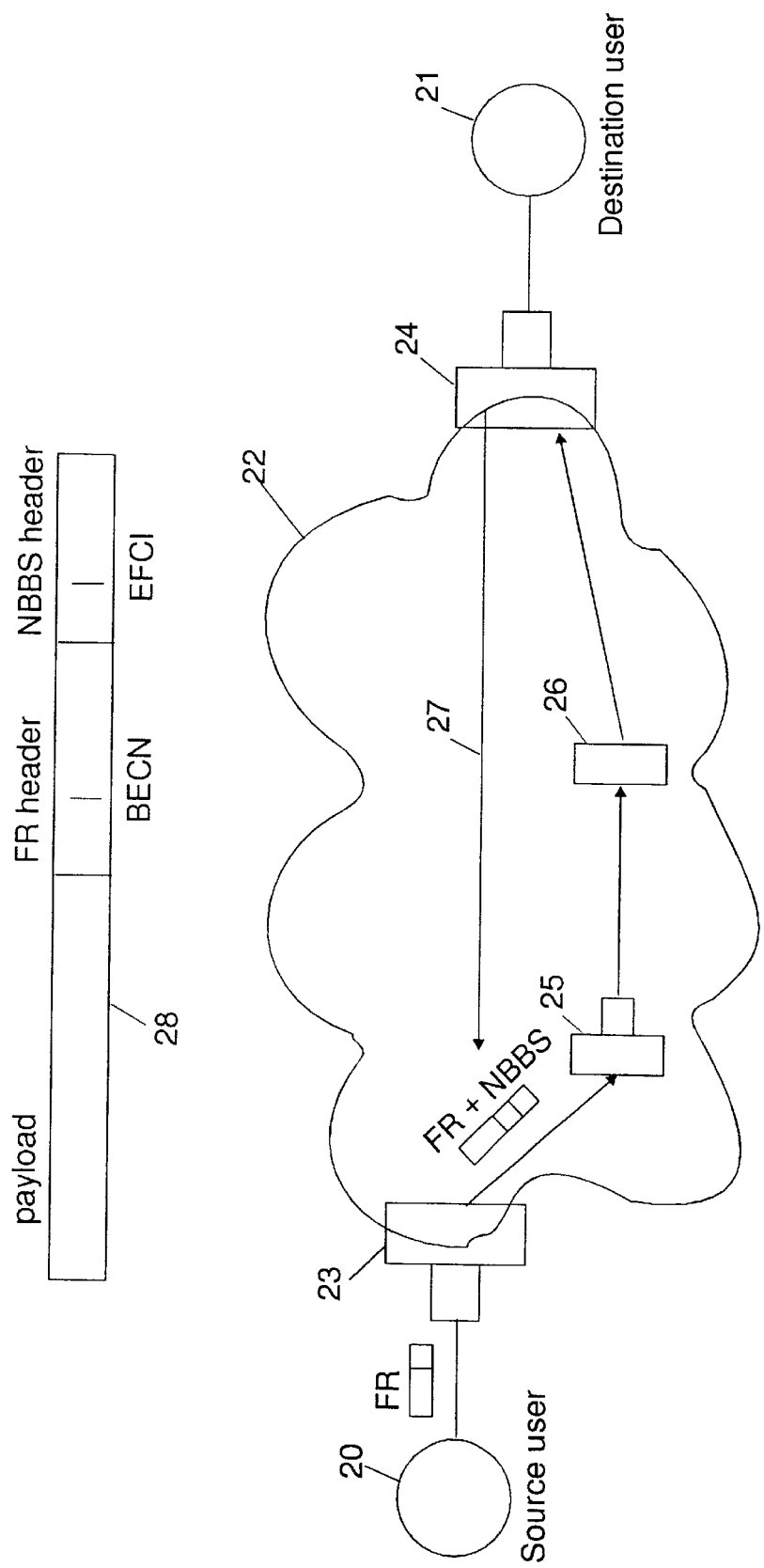
FIG. 2 is a basic representation of a network implementing the invention.

FIG. 2 is a schematic representation of a network implementing the invention. It shows a connection set between a source end-user 20 and a destination end-user 21 through a digital communication network 22. The network includes an entry access node/port 23 through which the source user 20 is attached to the network 22, while the destination user 21 is attached to the network 22 via exit access node/port 24. Assume that, at call set-up, the source end-user's request for a connection had been executed by setting a forward path via transit nodes 25 and 26. Since the traffic works both ways, Assume that the return path between user 21 and user 20 was established as indicated by arrow 27 also through a series of transit nodes (not shown in the figure). Consider first traffic originating at user 20. As already mentioned, in a packet switching system, source traffic is split into packets including a data payload and a header containing control information. Packets may either be of fixed length as in Asynchronous Transfer Mode (ATM) of operation or be of variable length as in Frame Relay (FR) mode of operation. According to this invention, the packets flows are monitored throughout the forward path, in each intermediate transfer node on the path. As soon as traffic congestion is detected in one of the nodes, a predefined header field is marked or set to indicate congestion has been detected. When a congestion indication is detected in exit node 24, each packet in the return path 27 is marked further congestion.

Again, we must say that this invention applies whatever be the type of traffic, be it organized in Asynchronous Transfer Mode (ATM) or in Frame Relay (FR) mode. But the mode of operation selected herein to describe the invention is the FR type (see FIG. 2). Accordingly, each packet of data provided by the source (20) traffic includes a payload section and a Frame Relay header section (FR header)(see packet 28). Now, for the purpose of this invention, each packet entering access node 23 is provided therein with a header. The fields selected for both marking congestion indication (CI), through a so-called Explicit Forward Congestion Indication (EFCI) in any network node along the forward path going through nodes 25, 26, . . . , and for Returning said Congestion Information (RCI), have herein been selected to be in the header and in said Frame Relay (FR) header, respectively. Also, and for optimizing traffic efficiency, these fields have been limited to be one-bit long each in the best mode of implementation of this invention. Naturally, those field locations and lengths selection shall by no means be considered as limiting the scope of this invention. A person skilled in the art understands that longer fields shall enable carrying more detailed flow congestion information while increasing network complexity and increasing operating cost, as shall be explained further in this description.

As already known in the art of digital communication, and disclosed in several European Applications (e.g. Publication Number 0000719065 and Application Number 95480182.5) each network node basically includes input and output adapters interconnected via a so-called node switch. Each adapter includes a series of buffers or shift registers where the node transiting packets are stored. Traffic monitoring is generally operated via preassigned buffer threshold(s) helping monitoring shift register queues, as shall be described with reference to FIG. 3.

Figure 3:
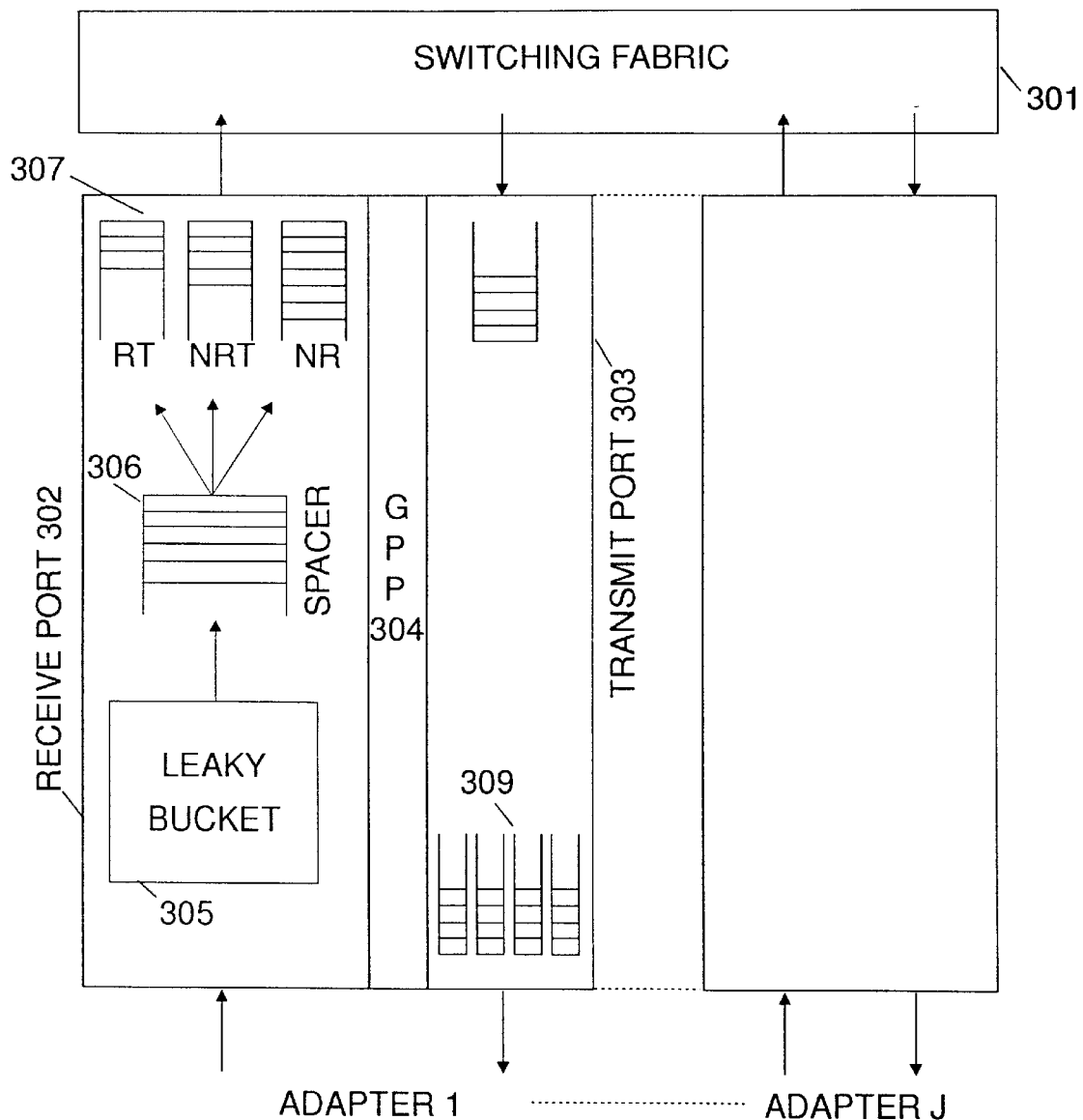
FIG. 3 is a schematic representation of a network node in which a preferred embodiment of the invention can be implemented.

Represented in FIG. 3 is a simplified block diagram showing a network node with the corresponding facilities used to implement the invention. Basically, it includes a series of adapters labeled adapter i with i=1, 2, . . . j (j being the number of adapters), and a high speed packet switching fabric (301). Each adapter is connected to a network link/trunk. Each adapter includes a receive port section (302), a transmit port section (303) and processing facilities herein designated as General Purpose Processor (GPP) (304). The packets arriving on the node via the receive port are oriented toward the appropriate node adapter (transmit section) to finally reach the destination user through the preassigned network connection path. Switching between an adapter receive port and an adapter transmit port is performed via the switching facilities (301). To that end, the adapters processing means determine the routing operations to be performed, by using indications provided within the data packet headers. As represented in FIG. 3, the adapters include queuing facilities for queuing the packets prior to or subsequent to their launch on the switch (301).

As mentioned, at connection set-up time, two paths, one for each direction are computed between the original access node and the destination access node attached to the calling source user and the destination user, respectively. The connection set-up and bandwidth reservation process operate to adjust, if the call has been accepted, an access control device (e.g. leaky bucket 305) according to the network connection characteristics. The leaky bucket may be provided with traffic shaping capabilities; e.g., spacer 306) A more detailed description of both possible implementations and operations of the leaky bucket means shall be provided later with reference to FIG. 4.

Once exiting the leaky bucket/spacer means, the data packets are oriented toward different queuing elements (307) based on the assigned priorities. In the preferred embodiment of this invention, three different priorities have been assigned, i.e. in decreasing priority order: one for so called Real Time (RT) traffic, one for Non Real Time (NRT) traffic, and the third one for Non Reserved (NR) traffic. Traffic congestion is declared when predefined threshold(s) are reached in the transmit adapter port (303) queues (309).

Now returning to FIG. 2, let's for the moment assume one single threshold level for denoting congestion in a network node has been assigned to the system. As soon as this threshold is reached in anyone of the network nodes of the in-going (forward) path between source (20) and destination 21 (e.g. in node 25), a congestion indication EFCI bit is set to "1" in the header of the packet actually issuing the queue, down to exit node 24. In the node 24, and prior to removing the header from the received packet, the congestion indication EFCI bit is monitored. When an EFCI bit at binary level "1" is detected, the destination port (24) marks each packet in the backward flow, i.e. from port 24 acting now as a source for user 21 back to original source user's port 23, with the Returned Congestion Information (RCI), by setting to "1" the BECN bit in the FR packet header (see 28). When the source port receives a packet with the BECN bit at binary level "1", a predefined flow control action is taken. For ATM/ABR traffic the RCI bit may be selected in the RM cell.

Several flow control operating algorithms might be defined but efficient algorithms should preferably provide a mechanism for dropping the transmission rate on the congested path in a single large step and then enable slowly going back to full rate step by step.

Thus, in the preferred mode of implementation of this invention, the action to be taken upon reception of a packet indicating congestion, i.e with the RCI (BECN) bit set (i.e at binary level "1"), is based on an additive increase and a multiplicative decrease of the considered sending rate, and this control action is performed in the entry node 23 directly under network control rather than source control, therefore neutralizing any burden due to a misbehaving source user. The parameter for the increase is called Rate Increase Factor (RIF) and is expressed as a quantile of predefined peak rate. The factor for the decrease is called Rate Decrease Factor (RDF) and is a quantile of the actual rate.

Now as far as implementation is concerned various flow regulating devices are already known in the art. They are based on so-called usage parameter control (UPC) made to prevent connections from sending with different characteristics than those negotiated in the traffic contract, whether this is done on purpose or not.

Figure 4:
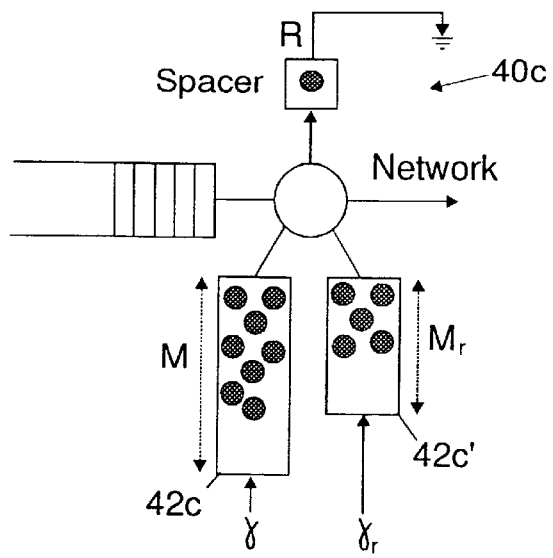
FIG. 4 (consisting of FIGS. 4A, 4B and 4C) shows leaky bucket arrangements to be used in the invention.
Figure 4:
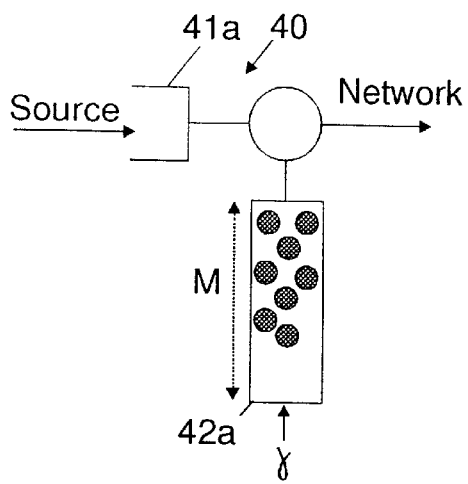
Figure 4:
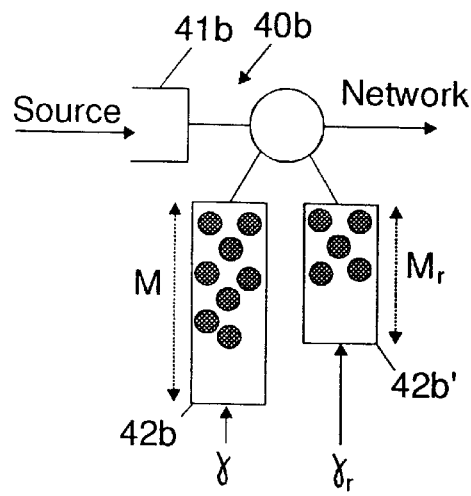

One of these flow regulating systems utilizes a so-called leaky bucket (see FIG. 4 representing three different leaky bucket implementations (4a; 4b and 4c)) including an admission shift register (e.g. 41 a) wherein the data packets are buffered and a so-called leaky bucket mechanism to control their passing further to the network.

The Leaky Bucket label describes a family of algorithms with the same basic principle, based on the consumption of credits designated as tokens (see FIG. 4). The tokens are generated at a rate γ and can be accumulated in a token pool or bucket (42a) with the size M. When the token pool is full, no more tokens are generated.

Each packet generated at a source has to pass the Leaky Bucket (see 40a) before entering the network and needs a certain number of tokens to pass. The number of tokens can correspond to the packet size in bytes or for ATM, one token can correspond to one cell. When no more tokens are available, the packet is dropped rather than being passed.

A full token pool means that a source may send a burst of size M at peak rate without losing a packet in the Leaky Bucket. On the other hand, an empty token pool means that a source may still send at rate γ and all packets arriving at higher rate are dropped.

The Leaky Bucket is determined by the parameters (γ,M). An appropriate setting of these parameters can be used to enforce the usage parameters. For example, a low burst tolerance will be translated by a small M and the peak rate will be an upper bound for γ.

Various extensions to the basic Leaky Bucket represented in FIG. 4a, exist. One of the most used is the extension to allow violation tagging. As shown in FIG. 4b, two token pools (42b, 42b') are used in that case. The second pool(42b') is used to allow excess packets to enter the network, but marked with lower priority. The parameters $\gamma_r$ and $M_r$ are used for the second pool, called the red token pool. Accordingly marked packets are called red packets and the tokens are called red tokens. The traffic in the first pool is denoted green and is controlled by green tokens (see pool 42b).

For each packet, the green token pool is first checked to see if enough green tokens are available. If there are not enough green tokens, the red token pool is considered. If there are enough red tokens, the packet is assigned a lower priority before being sent into the network, otherwise the packet is dropped.

A third version of the leaky bucket may be implemented, ensuring Traffic Control, Priority Control and Traffic Shaping. It is a Leaky Bucket linked with an entry buffer and a third pool: the spacer (see FIG. 4c). Conceptually, the spacer receives the tokens from the leaving packet and is emptied at peak rate R. To send a packet immediately, two conditions must simultaneously be true. The spacer must be empty and there must be enough tokens in the green or the red pool (42c42c'). In other words, a packet may not leave the system until the spacer is empty, even when there are enough red or green tokens. In this way, the transmission rate can be controlled and can never be higher than R.

The implementation often differs from the concept, as the spacer is implemented as a scheduler. The scheduler calculates the next possible departure time after the last packet with the peak rate R and attributes this time to the current packet.

This kind of mechanism is only applied to delay-insensitive traffic classes.

The general question for Leaky Bucket algorithms concerns the rate $\gamma$. Which rate should be used for the reconstitution of the tokens and which bandwidth should be reserved for the connection ? This domain is called Resource Management and is widely documented in the literature. The theory allows calculation, starting from the available buffer space and the traffic descriptor, of all the parameters of the Leaky Bucket. The calculated parameters guarantee a very low loss probability with a certain interval of confidence for the data sent into the network.

With these kinds of arrangements the network may be designed and managed to assign, say 85% of a link nominal capacity to reserved traffic and then dynamically monitor and control the remaining bandwidth and assign it to so-called excess traffic. The invention enables control of excess traffic at the network entry node to avoid network congestion without having to rely on traffic sources behavior.

Figure 5:
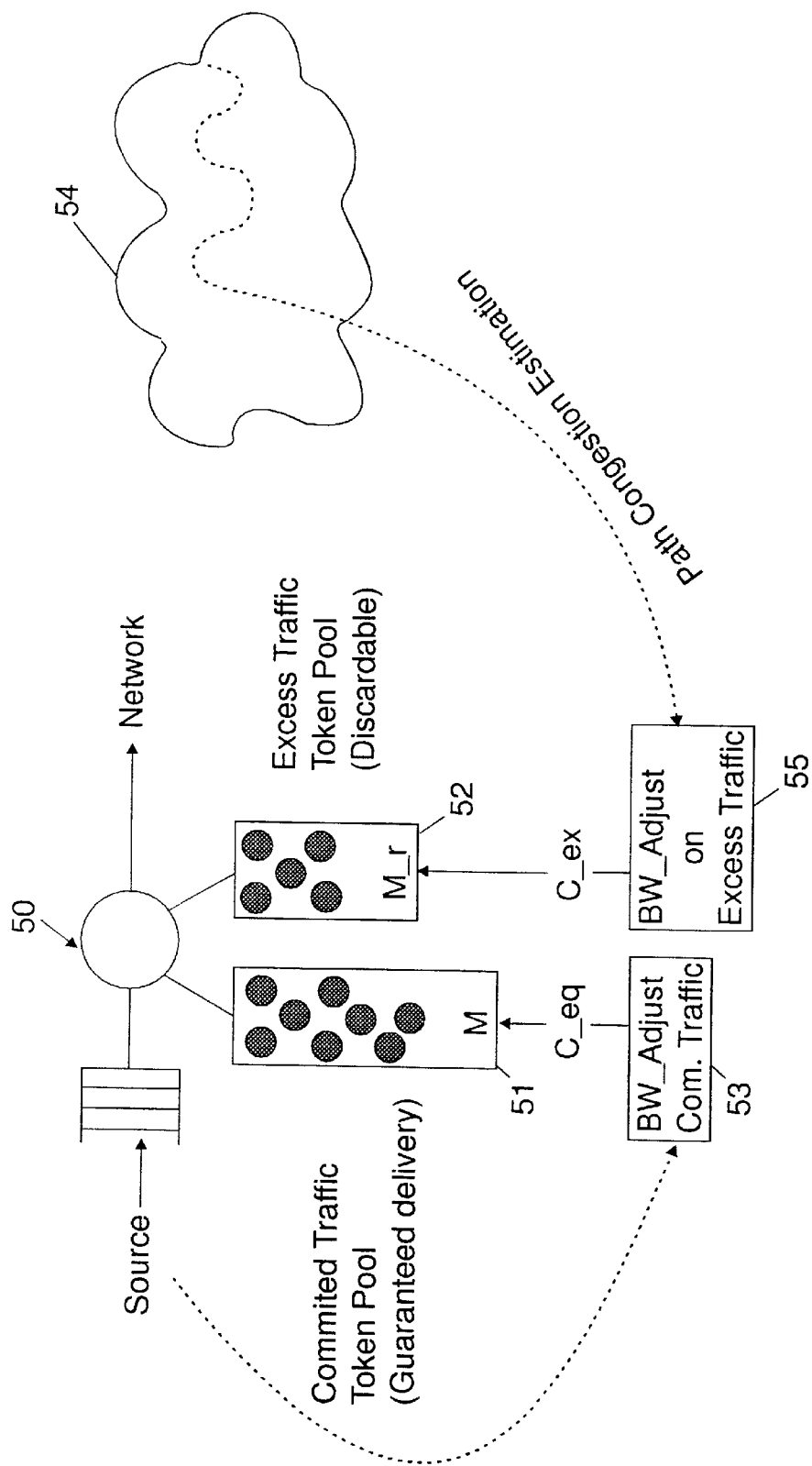
FIG. 5 is a schematic representation of the invention as implemented with a leaky bucket.

This principle is schematically represented in FIG. 5. A double token pool (51,52) is again used for controlling the traffic entering the network through leaky bucket mechanism 50 (possibly including a spacer not shown). The token pool 51 is used to manage committed traffic whose delivery has been guaranteed at rate C_eq equal to the equivalent capacity that has been reserved for the considered connection in the network, or with a token rate which fits the minimum guaranteed bandwidth. Any bandwidth (BW) adjustment through leaky bucket control (53) for committed traffic is then left to the source. But for the excess traffic which by nature is discardable, it shall be handled under the path congestion mechanism of this invention using the EFCI/BECN indications provided by the communication network (54) to the network access node involved, to adjust the Excess Traffic (ET) token rate (55) and therefore adjust the excess capacity (C_ex) at network entry without involving the data source, by adjusting the token pool refill rate to R_r as required, to dynamically optimize bandwidth utilization while avoiding network congestion.

In operation, for said excess/discardable traffic, the port algorithm may be designed so that the parameters will be adjusted according to the information of experienced congestion (RCI). The above mentioned adjustments might be performed periodically, or integrated.

The algorithm as implemented in the source and destination ports of the preferred embodiment of this invention is summarized below. It should be remembered that the action to be taken for packets with the RCI (e.g BECN) bit set to one, is based on additive increase or multiplicative decrease of the sending rate. The parameter for the increase (i.e. the Rate Increase Factor (RIF)) is expressed as a quantile of the peak rate, while the Rate Decrease Factor (RDF) is a quantile of the actual rate. A new variable, i.e. the red token Refill rate (R_r) is introduced. This rate is only used to calculate the increase and decrease and is translated into the Refresh period (R_p) at the end of the action per packet. The rate R_r is not a real send rate. It is an upper bound for a possible mean send rate, due to its integration into the leaky bucket behavior.

The source port algorithmic steps for the adjustment of the leaky bucket parameters are as follows:

1. When congestion is detected after integration of the RCI indications, the red token pool size (M_r) is normalized to the maximum packet size (e.g. 2 KB). The refresh period is adjusted by conforming to the new M_r value (which is initially set to the time to send M_r with peak rate). The red token refill rate (R_r) is derived from the red token pool size and the refresh period by the calculation R_r=M_r/R_p.

2. For each congestion detected after integration of the congestion indications in packets, the rate is decreased by the factor RDF (0.85 for example) until the lower bound (5 kbps for example) is reached:
   If (R_r*RDF)>0.005 Then R_r is set to R_r*RDF;
   (the symbol * indicating a multiplication)

3. For status of no congestion, after integration of the congestion indication, the rate is increased by the addition of the RIF multiplied by the peak rate until the peak rate is reached:
   If R_r+(R*RIF)<R Then R_r is set to R_r+(R*RIF);
   where R is the actual access rate, 4. The refresh period is derived from the red token refill rate: R_p:=M_r/R_r;

In other words, the system first starts with a check whether a congestion control action is needed. In case of a positive answer, the red rate in the leaky bucket (i.e: R_r) of the source entry node (23) is decreased by the rate decrease factor (RDF) and the refresh period in the leaky bucket (R_p) is set to (M_r/R_r) wherein M_r designates the size of the red token pool in the leaky bucket. Otherwise, the red rate in the leaky bucket is increased by R*RIF, with R being the actual access rate and RIF the rate increase factor and then the R_r period in the leaky bucket is refreshed. In either case, R_r is limited to R.

Where the destination port (e.g. see 24 in FIG. 2) detects an EFCI bit set at binary value "1", it has to notify the transmit side of same network exit node adapter of the experienced congestion with the noted frequency. The adapter transmit side will then mark all the packets of the connection travelling in the opposite direction (see 27 in FIG. 2) with the congestion indicator, i.e., will set the RCI bit in all the packets sent on the backward connection. In this case, the destination port (24) does not smooth the information. In fact, the value of the EFCI bit of the last packet received in the destination port (24) before the information is sent to the transmit side is decisive for the value of the RCI bit for the connection.

Thus, in the above described implementation no smoothing algorithm was applied on the receive side to convey the information back. This can be explained by the aims of the algorithm: protect the network, i.e. avoid packet loss and use available bandwidth, even when the bandwidth is available for a short time period.

When congestion is experienced, the source port adapter has to be notified immediately to slow down the red token rate in order to avoid excessive packet loss. That means, on the receive side, that when a port adapter receives only the last packet with the EFCI bit set and all the others did not have the EFCI bit set, it has nevertheless to convey the information about the detected congestion back to the source port. On the send side two options can be used. The port adapter may change the parameters of the leaky bucket to limit bandwidth use regardless of the number of RCI bits received at binary level "one". As an alternative, the port adapter may integrate the RCIs to smooth the leaky bucket changes. This smoothing phenomenon is particularly interesting as it enables substantial improvement in the congestion control with a minimal overhead.

Figure 6:
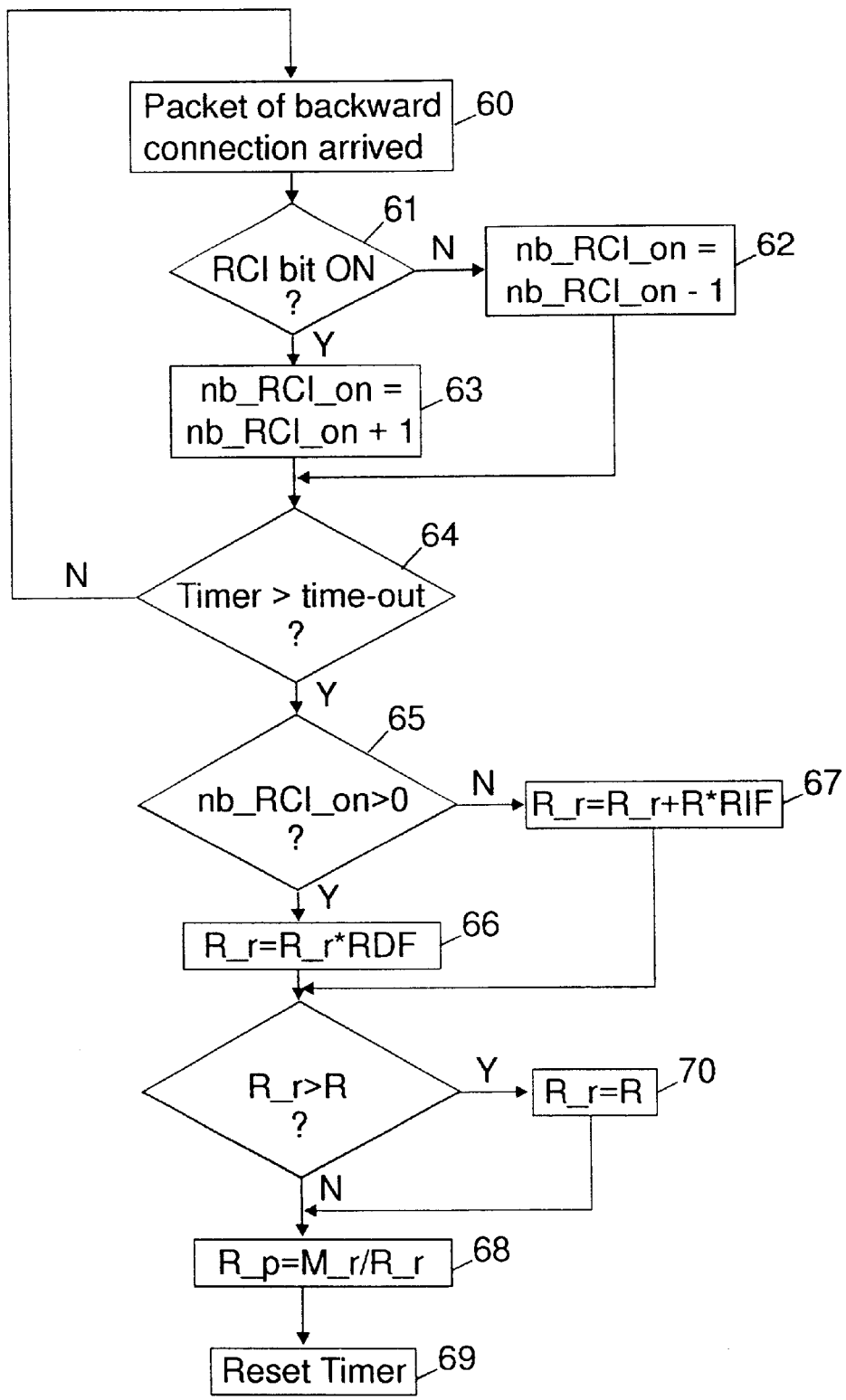
FIG. 6 is a flow-chart of the algorithm used in the invention.

The algorithm for implementing the inventive process is represented in FIG. 6. At connection set-up, two parameters of the connection (in each direction), one for the number of set RCIs bits (nb_RCI_on), and the second used as a timer, are initialized. The timer is set to zero and started, while the nb_RCI_on counter is set to zero.

Each time a packet is received in the backward direction (60), the RCI bit is extracted and tested (61). If this RCI bit is OFF, the nb_RCI_on counter is decremented by one unit (62), else, it is incremented (63). Then the timer indication is checked versus a predefined value considered as time-out indication (64). As long as the time-out is not reached, integration over the RCI bit goes on, with the process looping back to step (60). When the timer indicates a time-out, the integrated RCI bit indication is considered. In a preferred embodiment, the congestion status is evaluated as follows: if nb_RCI_on is higher than zero as indicated by test (65), then congestion is declared and the actual red rate ($R\_r$) is decreased as already indicated, by the predefined rate decrease factor (RDF) (see 66). Otherwise no congestion is declared and the red rate in the leaky bucket is incremented by R*RIF (67), with R being the actual access rate and RIF the rate increase factor and then the refresh period in the leaky bucket is amended to $R\_p=M\_r/R\_r$ (68). In both cases the timer is reset (69) and $R\_r$ is limited to R (70).

With the use of the timer, the flow control proposed integrates more or less depending on the data flow: if the backward data flow is important there will be a lot of "up-to-date" RCI information to process. To avoid multiple changes in the leaky bucket parameters and useless processing, integration is performed. If the backward data flow is low, each RCI indication is important and the integration is low.

The solution described with reference to FIG. 6 provides a valuable improvement over prior art while minimizing overhead traffic. It can still be improved by providing more precise leaky bucket regulation, assuming several different levels of congestion and different RDF/RIF functions of these levels.

Figure 7:
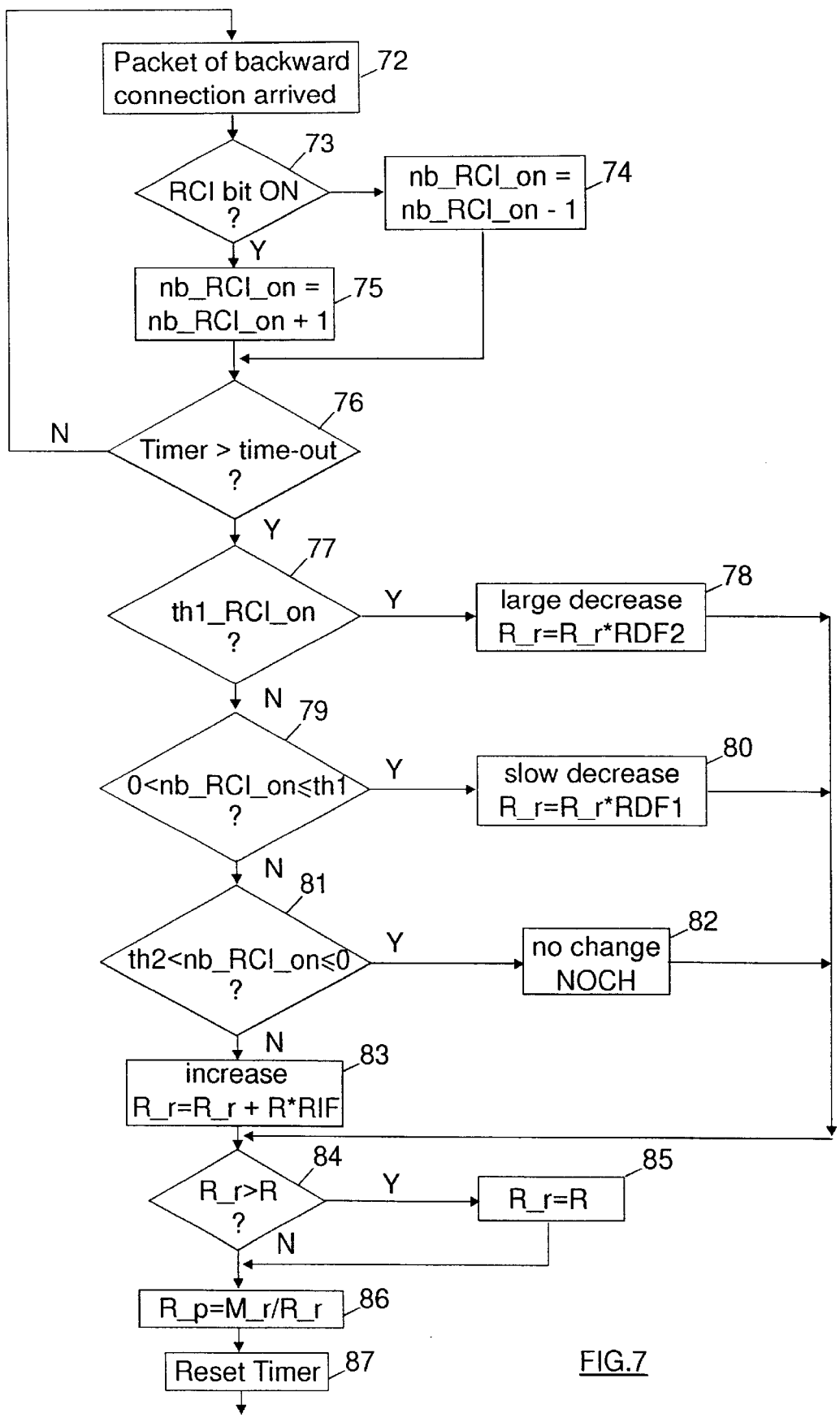
FIG. 7 is a flow-chart of an improved algorithm for providing enhanced operation of the invention.

One implementation of such an improved algorithm is represented in FIG. 7. The first series of operations (i.e: 72, 73, 74, 75 and 76) are identical to those described with reference to FIG. 6 (i.e: 62, 63, 64, 65 and 66), but once time-out is declared then the count of nb_RCI_on based on packets received over the feedback path is compared to achieve $R\_r=R\_r*RDF2$ with RDF2 being the largest predefined rate decrease factor. Otherwise, if the test (77) is negative, a second test is performed (79) to check whether nb_RCI_on is between zero and th1. If this is the case, then a decrease at slower rate (RDF1) is implemented (80) and $R\_r$ is made equal to $RDF1*R\_r$; otherwise a third test is performed (81) versus a negative threshold th2. If the nb_RCI_on is between zero and th2, then the rate is kept unchanged (82), otherwise it is increased (83) to $R\_r+RIF*R$, with a limitation to the peak rate level (84, 85) and the token pool refresh period is refreshed to $M\_r/R\_r$; then the timer is reset (87).

Figure 9:
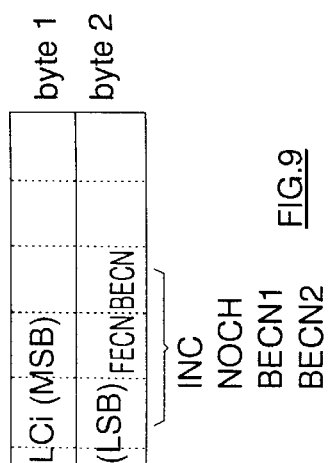
FIG. 9 is a detailed representation of the header used in the implementation according to FIG. 8.
Figure 8:
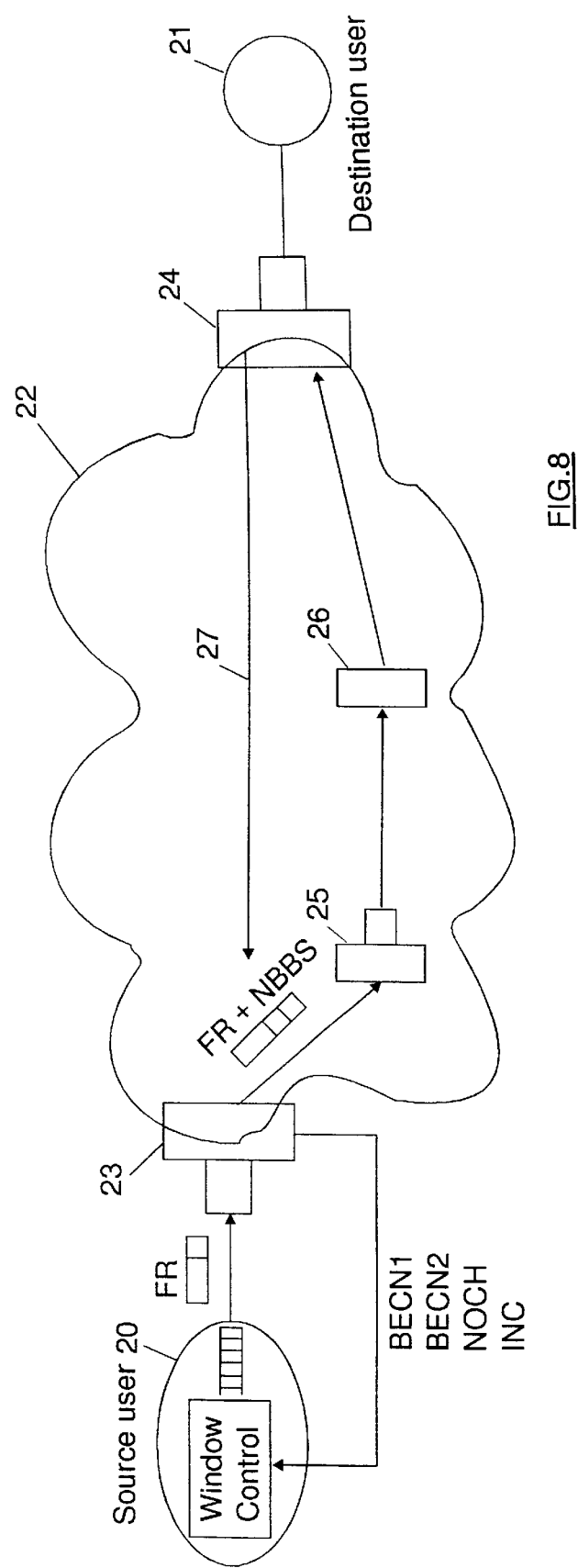
FIG. 8 is a schematic representation of a further improvement enabling source cooperation in the flow control mechanism.

Such an improved method and system enables a smoother rate regulation from the network entry access node and further enables driving the source user assigned window adaptation if required. To that end, the rate variations defined here above: i.e. Increase (INC) (83), no change (NOCH) (84), slow decrease (BECN1) (80) and large decrease (BECN2) (78) shall be coded with two bits in the input access node and fed back to the source, as represented in FIG. 8. These two bits may be selected in the two byte long Frame Relay header as defined in the ANSI Standards (see FIG. 9). In a preferred mode of implementation of this invention, these two bits have been selected to be the third and fifth bits of the Least Significant byte (byte 2). INC, NOCH, BECN1 and BECN2 are therefore coded accordingly. With these two bits, the process is thus improved to control the NCP window feeding the source queue as illustrated in FIG. 8.

The four rate variations defined in FIG. 7, steps 78, 80, 82 and 83, while being used in the flow control operated in the network access node 23 in response to the network 22 congestion integration over the considered connection, are also used for source control. This additional control is performed over the NCP window of source user 20. Several window controls may be defined, but in the preferred mode of implementation of this invention, the window adjustments have been made as follows:

if BECN1 (slow decrease), then the window is adjusted to:
window=window-n (with n=1).
if BECN2 (large decrease), then window=window/p (with p=2).
if NOCH (no change), then window=window.
if INC (large increase), then window=window+q (with $q \geq 1$).

Consequently, the single bit added to the overhead in the backward path within the network 22 enables smooth flow control directly from the considered network entry access node thanks to judicious integration of congestion indicators in said access node. Further smoothing for congestion control is possible where combined with multiple thresholding. In addition multiple thresholding operation may be coded into the entry access node and fed back to the source user system to enable further regulating the source generated data flow if required without being bound to non-behaving sources. The method is therefore quite convenient in that it enables a smooth and flexible congestion control releasing the network from any unnecessary additional overhead.

The preferred embodiment of the invention as described herein was limited to two bits for the overall forward and backward congestion indications to limit the overhead on the links. But some improvements to the invention can still be provided by using these bits in a slightly different way.

In effect, when using one threshold only to detect congestion and set and reset the EFCI bit in the packet header, a typical threshold phenomenon can occur with oscillations around this threshold.

These oscillations could be avoided by a second "unset-threshold". When a packet arrives and the queue size is greater than the set-threshold, the EFCI bit is set in all the packets. Only when the queue size gets below the unset-threshold, the EFCI bit won't be set anymore. This "hysteresis" avoids oscillations around one congestion indication threshold.

However, the oscillations might in some cases be ignored if the packets are not discarded at this threshold, they are only equipped with an additional information. Knowing that the information is not translated immediately into the RCI field, but with a certain frequency, it does not matter a lot if there is a mixed sequence of EFCI and non-EFCI packets. In the worst case the source would receive one wrong 'no congestion' information. The buffer in the trunks is supposed to support these short time periods of wrong information.

Once more the delay criterion has to be considered talking about two different thresholds. When the queue size becomes smaller this means that the input rate is smaller than the output rate. When the whole queue is empty, the link would be under-utilized. The unset threshold should therefore be reasonably high, to inform the sources as soon as possible that the congestion situation does not exist anymore. Knowing the already added delay we would tend to fix the unset-threshold higher than the set-threshold, which implies a certain complexity in implementation (the trunk has to keep track of the increase or the decrease of the queue size).

For implementation reasons an unset-threshold would add supplementary delay because it would be lower than the set-threshold, i.e. it would need more time to decrease the queue size to reach the unset-threshold. This added delay would decrease bandwidth utilization as the sources would start later to recover from the experienced congestion.

A simulation performed at T1 link speed to evaluate the impact of two thresholds on the system as compared with one threshold provided the following results:

| Criterion | Two thresholds | one threshold | difference |
|---|---|---|---|
| LINK UTILIZATION | 82.53% | 82.04% | 0.49% |
| PACKETS LOSS AT TRUNK | 0.0165% | 0.0206% | 0.0041% |

In conclusion, a second threshold in the forward direction could avoid periods where some packets are marked and others are not. This could theoretically increase fairness and reactivity of the sources. Simulations showed, that there is only a minor difference between the use of one or two thresholds. The oscillation periods are very short as the queue growth has always a clear direction upward or downward.

Some improvements to the invention efficiency might be obtained by focusing on a number of parameters in the implementation.

For instance, a modification in the way the packets are EFCI marked would lead to higher bandwidth utilization. If, instead of being marked in the receive port, when they arrive on the adapter the packets are marked just before they are sent away (i.e. after buffering) the responsiveness of the system would be improved.

Responsiveness of the system might also be optimized by a careful selection of the Rate Decrease Factor (RDF) and Rate Increase Factor (RIF) of the algorithm. For instance, the RDF and RIF values were evaluated for a range of trunk speeds from 128 Kbps to 44.74 Mps. The values optimized for a T1 trunk gave reasonable throughput for all tested speeds with RDF=0.85 and RIF=0.002. In other words, on each intervention the rate shall be decreased to 85% of its old value, or increased by a constant of $0.002*R$. The decreases are quasi exponential and the increase almost linear. These values are key points in terms of responsiveness of the system. The aim of the so called excess traffic controlled by the invention is to use even shortly available bandwidth. Therefore the RIF should be preferably selected high enough to enable the system to adapt in few steps to a higher rate. On the other hand, a too high value would increase the rate too fast, allowing the sources to send too much packets when congestion occurs before its notification reaches the source, leading finally to packet loss at the congested trunk.

On the other hand, a too small value would be inappropriate if the number of sources is low.

Therefore a compromise value should be selected carefully, based on the possible number of connections involved.

The RDF value should also be selected carefully to enable optimized adaptation to less available bandwidth.

The decrease of the rate must be done as fast as possible, because the congestion is always detected too late, due to the various delays the propagation of the information suffered from. The exponential character of the decrease provides this fast response, in 1 sec, i.e. after 10 adjustments, the rate is at 20% of its original value.

A local optimization for each trunk speed makes not always sense as computer networks often integrate lines with different transmission speeds.

The red packet discard threshold has a direct impact on the ability to accept bursts and on the queue size, which is translated into added delay for the packets. There are four main ideas behind the value of the red packet discard threshold:

1. Use the available buffer to accept bursts Each trunk is equipped with 256 KByte buffer space for the NRT and NR traffic classes. This buffer can provide a great flexibility for the adapter to accept data bursts.
2. Protect the green packets by leaving them enough space above the red packet discard threshold. Even by discarding red packets, there may be the situation where there are bursts of green packets, leading to queue size values over the red packet discard threshold. It has to be assured, that the queue size never exceeds the available buffer size, to avoid the discarding of green packets. Therefore the red packet discard threshold has to be inferior to the available buffer space.
3. Assure maximum delays for low speed trunks. A queue size of 200 KB implies a sending a delay of 12.5 s at 128 Kbps. This can lead to time-out events for NBBS messages and higher level protocols. The queue size has therefore to be reasonably small to assure maximum sending delays of less than 1 sec per congested trunk at low speed.

With the above solution provided by this invention for monitoring and controlling congestion, a fairly stable mechanism is made possible. It is nearly insensitive against packet loss and reacts to congestion before packets are lost, and, most of all, it is not impacted by non-compliant sources since it is implemented within the network, with adjustments of the traffic source being made possible on top of the basic input node control, both being independent from each other which is quite convenient in case of misbehaving source users. Additionally, the mechanism operates with nearly no added overhead, and can be easily implemented in presently available networks.

What is claimed is:

1. Method for performing congestion detection and flow control operations over data traffics including both discardable traffic and non-discardable traffic, in a high speed digital packet switching network including access and transit nodes interconnected by links or trunks, and wherein for any source end-user attached to said network via an entry access node and requesting its traffic to be vehiculated toward a destination end-user also attached to said network via an exit access node, a connection is established which includes so-called in-going (or forward) and returning (or backward) paths set from said entry node to said exit node and in the opposite direction from said exit node to said entry node respectively, which paths might include network transit nodes, said method including:

monitoring the data flow in each transit node over the forward path from said entry node to said exit node for detecting traffic flow congestion in said monitored transit node and in case of flow congestion being detected therein, setting so-called Congestion Indication (CI) bit in a first predefined so-called header field of data packets on the involved forward path down to the exit node;

said method being further characterized in that it includes:

monitoring the incoming data packets entering said exit node, and in case of a set CI indication being detected therein, feeding this indication back to said entry node by setting a Return Congestion Indication (RCI) bit in a second predefined header field in the data packets of the traffic of said backward path;

monitoring the packets received in said entry node over said returning (backward) path and integrating, in said entry node, said RCI bits indications over a predefined period of time, said integration meaning adding or subtracting one unit depending whether said RCI bit is detected to be at binary value one or zero, respectively, said integration producing an integrated RCI indication;

monitoring said predefined time period, and when said time period is over, checking said integrated RCI indication; and, adjusting the communication bandwidth assigned to said discardable traffic over said forward path, from said entry node to said exit node in a predefined manner, according to said integrated RCI indications.

2. Method for performing congestion detection and flow control operations over data traffics according to claim 1, further characterized in that said communication bandwidth adjustment includes comparing, in said entry node, said integrated RCI indication bits to at least one predefined threshold levels and adjusting the transmission rate over the involved forward path from said entry node to said exit node, accordingly in a predefined manner.

3. A method for performing congestion detection and flow control operations according to claim 2, further characterized in that said thresholding indications are also fed back to the involved source end-user to enable further controlling the flow of behaving end-user.

4. A method for performing congestion detection and flow control operations according to claim 1, 2 or 3 wherein said non-discardable traffic addresses so-called committed traffic whose delivery is guaranteed while said discardable traffic is accepted on the network path as excess traffic to optimize network bandwidth occupation.

5. A system for performing congestion detection and flow control operations over data traffics in a high speed digital packet switching network including access and transit nodes interconnected by links or trunks, each node including adapters with receive and transmit sections respectively attached to node entering and exiting links or trunks and switching means for transferring data packets from receive to transmit adapter sections, and wherein for any source end-user attached to said network via an entry access node and requesting its traffic to be vehiculated toward a destination end-user also attached to said network via an exit access node, so-called forward and returning (or backward) paths are set from said entry node to said exit node and in the opposite direction from said exit node to said entry node, respectively, which paths might include network transit nodes, each said end-user's traffic being either qualified as high priority level committed traffic whose delivery is guaranteed and assigned predefined transmission rate limits whereby a predefined amount of total transmission bandwidth is being reserved to it accordingly, or qualified low priority level discardable excess traffic and assigned whatever bandwidth is left, said system being characterized in that it includes:

means in said adapter transmit section for dispatching the data packets, each packet including a so-called payload section and a so-called header section, toward output queues based on said priority levels;

means for monitoring the data flow in said output queues in each node over the forward path from said entry node to said exit node, for detecting traffic congestion in said monitored queues and in case of flow congestion being detected therein, setting a so-called Congestion Indication (CI) bit field selected for carrying Explicit Forward Congestion Information (EFCI) in a first predefined header section of forward data packets, on the involved path down to the exit node;

means for monitoring the incoming data packet entering said exit node, and in case of a set CI indication being detected therein setting a Return Congestion Indication (RCI) bit in a second predefined header section field in the data packets of the traffic flowing over said backward path;

means in said entry node for monitoring the packets received from said backward path and for integrating monitored RCi bits over a predefined time-out period;

means for monitoring said time period and at time-out indication, comparing said integrated RCI indication to at least one predefined threshold level and for controlling accordingly the bandwidth adjustment means in the involved receive adapter section of said entry node for adjusting the communication bandwidth assigned to said discardable traffic over said forward path, from said entry node to said exit node in a predefined manner.

6. A system for performing congestion detection and flow control operations over data traffics in a high speed digital packet switching network according to claim 5 further characterized in that said means for monitoring the data flow in said output queues in each node over the forward path from said entry node to said exit node, for detecting traffic congestion in said monitored queues involves means for monitoring at least one predefined queue threshold level.

7. A system for performing congestion detection and flow control operations over data traffics in a high speed digital packet switching network according to claim 6 wherein a set and a reset threshold levels are predefined, whereby the EFCI is set in all packets when a packet arrives and the queue size is greater than the set-threshold and only when the queue size gets below the unset-threshold the EFCI won't be set anymore.

8. A system for performing congestion detection and flow control operations over data traffics in a high speed digital packet switching network according to claim 6 or 7 characterized in that said bandwidth adjustment means includes:

leaky bucket means assigned to discardable traffic data and provided with so-called red token pool means sized at a predefined value $M\_r$, and having a token refill rate $R\_r$, a red token peak rate R and a token refresh period $R\_p$;

means for decreasing $R\_r$ to $R\_r*RDF$, RDF being selected among at least one predefined Rate Decrease Factor smaller than one, for each packet received with a congestion indication set, and for setting the red token refresh period $R\_p$ to $M\_r/R\_r$, wherein $M\_r$ is the size of said red token pool; and, means for increasing $R\_r$ by a predefined amount (RIF) of the peak rate R.

9. For use in a packet switching network wherein a first connection is established to enable transmission of packets from a first node to a second node and a second connection is established to enable transmission of packets from the second node to the first node, wherein said second node monitors each packet received on the first connection for the presence of congestion indicators and responds to such indicators by setting a congestion indicator in packets later transported on the second connection and wherein packets may be designated as low priority or high priority packets, a congestion control method implemented in the first node comprising the steps of:

integrating the number of congestion indicators detected in packets received on the second connection over a predefined period of time; and adjusting the bandwidth allocated to low priority traffic on the first connection as a function of the results of the integrating step.

10. A method as set forth in claim 9 wherein the bandwidth adjusting step comprises the further steps of:

comparing the results of the integrating step to at least one predefined threshold level; and adjusting the bandwidth in a first predetermined manner if the results exceed the threshold level and in a second predetermined matter if the results don't exceed the threshold level.

11. A method as set forth in claim 10 including the further step of notifying the source of the traffic on the first connection if the predefined threshold level is exceeded to enable the source to further control the flow of traffic to the first node.

12. A method as set forth in any of claims 9–11 wherein the step of adjusting the bandwidth comprises the step of, if the integration results exceed a first level, decreasing the currently allocated bandwidth to a value $R*RDF$ where R is a predefined peak rate and RDF is a predefined Rate Decrease Factor or, if the integration results do not exceed the first level, of incrementing the currently allocated bandwidth by an amount equal to $R *RIF$ where RIF is a predefined Rate Increase Factor.

13. For use in a packet switching network wherein a first connection is established to enable transmission of packets from a first node to a second node and a second connection is established to enable transmission of packets from the second node to the first node, wherein said second node monitors each packet received on the first connection for the presence of congestion indicators and responds to such indicators by setting a congestion indicator in packets later transported on the second connection and wherein packets may be designated as low priority or high priority packets, a congestion control system implemented in the first node comprising:

a timer that times out at the conclusion of successive predetermined periods of time;

an integrating circuit which maintains an integration result reflecting the number of congestion indications detected in packets received on said second connection;

congestion detection logic responsive at the conclusion of each of the successive predetermined periods of time to obtain the current integration result and to reset the integrating circuit; and bandwidth control logic which adjusts the bandwidth allocated to low priority traffic on the first connection as a function of the obtained current integration result.

14. A system as set forth in claim 13 wherein the bandwidth control logic further comprises:

a leaky bucket mechanism for receiving low priority traffic intended for the first connection, the leaky bucket mechanism maintaining a red token pool of predetermined size and having a predefined token refill rate, a predefined red token peak rate R and a predetermined token refresh period, said mechanism including logic for decreasing the token refill rate by a predetermined factor for each packet received on the second connection with a congestion indicator and for setting the red token refresh rate equal to $M/R\_r$ where M is the size of the red token pool and $R\_r$ is the token refill rate.

15. For use in a packet switching network wherein a first connection is established to enable transmission of packets from a first node to a second node and a second connection is established to enable transmission of packets from the second node to the first node, wherein said second node monitors each packet received on the first connection for the presence of congestion indicators and responds to such indicators by setting a congestion indicator in packets later transported on the second connection and wherein packets may be designated as low priority or high priority packets, a computer program product for use in the first node comprising a computer usable medium having computer readable program code embodied therein for performing congestion control at the first node, the computer readable program code comprising code for integrating the number of congestion indicators detected in packets received on the second connection over a predefined period of time, and adjusting the bandwidth allocated to low priority traffic on the first connection as a function of the results of the integrating operation.

* * * * *